United States Patent
Lee

(10) Patent No.: US 10,602,171 B2
(45) Date of Patent: Mar. 24, 2020

(54) VIDEO DECODERS AND ELECTRONIC SYSTEMS INCLUDING THE SAME

(71) Applicant: Samsung Electronics Co., Ltd., Suwon-si, Gyeonggi-do (KR)

(72) Inventor: Kyung-Koo Lee, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 194 days.

(21) Appl. No.: 15/492,695

(22) Filed: Apr. 20, 2017

(65) Prior Publication Data

US 2018/0084265 A1    Mar. 22, 2018

(30) Foreign Application Priority Data

Sep. 21, 2016    (KR) .................... 10-2016-0120445

(51) Int. Cl.
*H04N 19/44* (2014.01)
*H04N 19/91* (2014.01)
*H04N 19/13* (2014.01)

(52) U.S. Cl.
CPC ............. *H04N 19/44* (2014.11); *H04N 19/13* (2014.11); *H04N 19/91* (2014.11)

(58) Field of Classification Search
CPC ......... H04N 19/44; H04N 19/91; H04N 19/13
See application file for complete search history.

(56) References Cited

U.S. PATENT DOCUMENTS

| | | | |
|---|---|---|---|
| 7,365,660 B2 | 4/2008 | Park et al. | |
| 7,411,529 B2 | 8/2008 | Park et al. | |
| 7,592,937 B1 | 9/2009 | Chang | |
| 7,656,326 B2 | 2/2010 | Hussain et al. | |
| 7,804,903 B2 | 9/2010 | Haque et al. | |
| 7,839,311 B2 | 11/2010 | Bao et al. | |
| 7,956,776 B2 | 6/2011 | Sakaguchi | |
| 7,978,102 B1 | 7/2011 | Lin | |
| 8,094,048 B2 | 1/2012 | Park et al. | |
| 8,212,696 B2 | 7/2012 | Chang et al. | |
| 8,319,672 B2 | 11/2012 | Kim et al. | |
| 8,482,440 B2 | 7/2013 | Lee et al. | |
| 9,264,706 B2 | 2/2016 | Karczewicz et al. | |
| 9,351,003 B2 | 5/2016 | Cote et al. | |
| 2006/0023795 A1* | 2/2006 | Kim .................... | H03M 7/4006 375/242 |

FOREIGN PATENT DOCUMENTS

| | | |
|---|---|---|
| JP | 2008-172545 | 7/2008 |
| KR | 10-1108674 | 1/2012 |

* cited by examiner

*Primary Examiner* — Tat C Chio
(74) *Attorney, Agent, or Firm* — Myers Bigel, P.A.

(57) ABSTRACT

A video decoder may perform, based on an operation mode, at least one of a first decoding operation to restore a first bin value based on a first context value, a second decoding operation to restore a second bin value based on an updated first context value or a second context value, a third decoding operation to restore a third bin value based on the updated first context value or a third context value, and a fourth decoding operation to restore at least one bypass bin value without a context value. Based on the operation mode, the video decoder may output the first bin value, the at least one bypass bin value, the first bin value and the at least one bypass bin value, the first bin value and one of the second and third bin values, or at least one of the first, second, and third bin values.

20 Claims, 11 Drawing Sheets

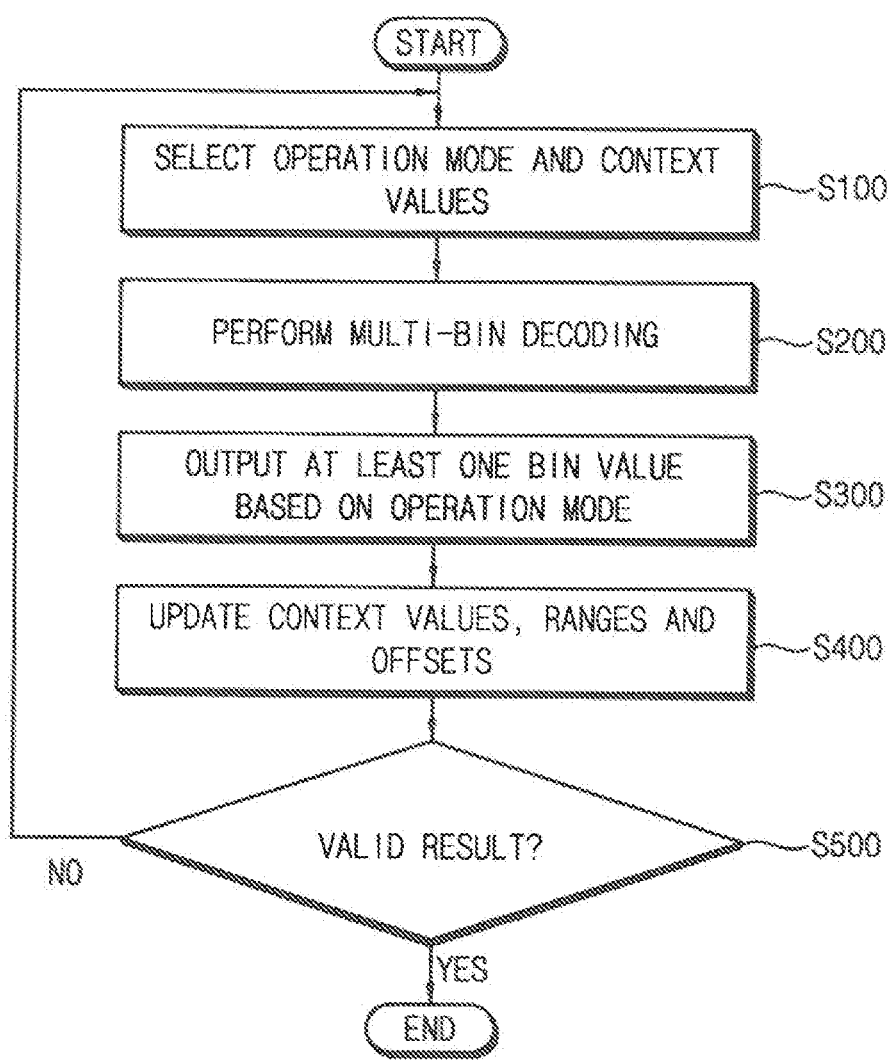

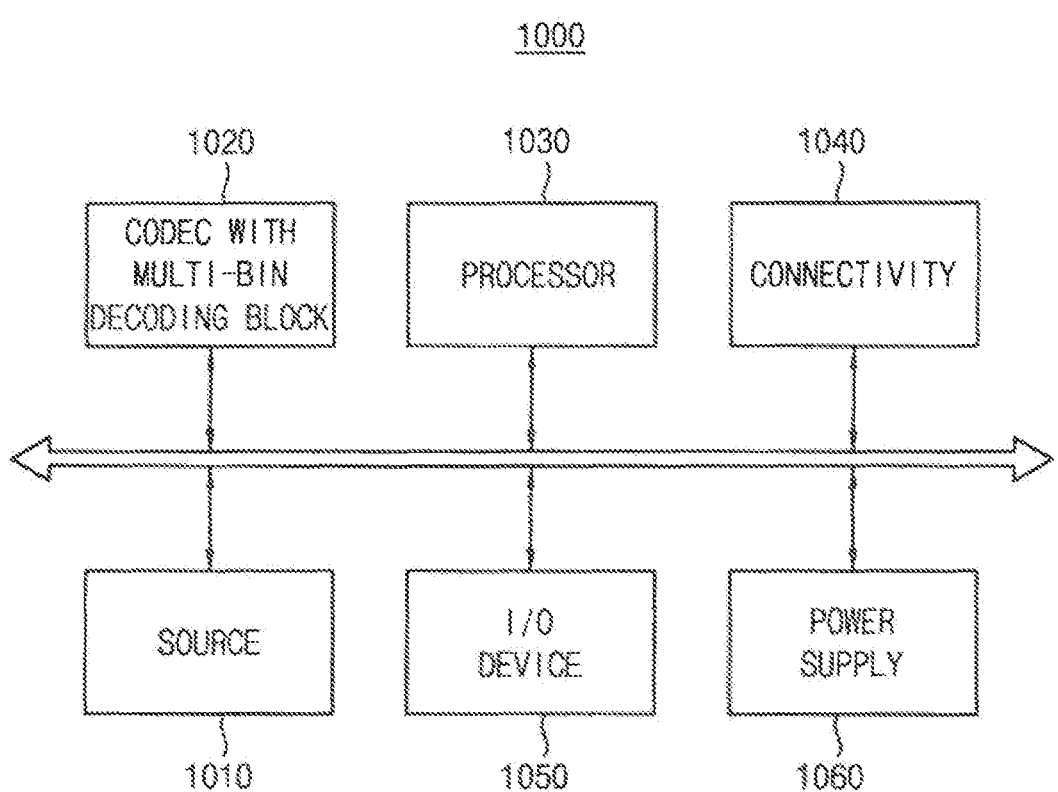

VIDEO DECODERS AND ELECTRONIC SYSTEMS INCLUDING THE SAME

CROSS-REFERENCE TO RELATED APPLICATION

This application claims priority under 35 USC § 119 to Korean Patent Application No. 10-2016-0120445, filed on Sep. 21, 2016 in the Korean Intellectual Property Office (KIPO), the contents of which are herein incorporated by reference in their entirety.

BACKGROUND

1. Technical Field

Example embodiments relate generally to video or image processing, and more particularly to video decoders using context-based adaptive binary arithmetic coding (CABAC) and electronic systems including the video decoders.

2. Description of the Related Art

According to increasing demands for high resolution and high quality videos, such as high definition (HD) videos, ultra HD (UHD) videos, etc., research has focused on video data compression and decompression for achieving improved compression performance. A context-based adaptive binary arithmetic coding (CABAC), which is a kind of entropy coding, has a relatively complex algorithm and a relatively long coding time. Research has been conducted on techniques of efficiently decoding video data that is encoded by CABAC.

SUMMARY

Accordingly, the present inventive concepts are provided to substantially reduce or eliminate one or more problems due to limitations and disadvantages of the related art.

At least one example embodiment of the present inventive concepts provides a video decoder capable of efficiently and expeditiously performing multi-bin decoding.

At least one example embodiment of the present inventive concepts provides an electronic system including the video decoder.

According to example embodiments of the present inventive concepts, a video decoder may include a multi-bin decoding block and a decoding mode control block. The multi-bin decoding block performs at least one of a first decoding operation, a second decoding operation, a third decoding operation and a fourth decoding operation based on an operation mode. The first decoding operation represents a first operation of restoring a first bin value based on a first context value. The second decoding operation represents a second operation of restoring a second bin value based on one of an updated first context value and a second context value. The updated first context value is obtained after the first decoding operation. The third decoding operation represents a third operation of restoring a third bin value based on one of the updated first context value and a third context value. The fourth decoding operation represents a fourth operation of restoring at least one bypass bin value without a context value. The decoding mode control block is configured to perform an output operation to output the first bin value, to output the at least one bypass bin value, to output the first bin value and the at least one bypass bin value, to output the first bin value and one of the second and third bin values, or to output at least one of the first, second and third bin values based on the first bin value. The output operation of the decoding mode control block is performed based on the operation mode.

According to example embodiments of the present inventive concepts, an electronic system may include a video source and a video decoder. The video source provides an encoded bit stream. The video decoder decodes the encoded bit stream to generate a restored video. The video decoder includes a multi-bin decoding block and a decoding mode control block. The multi-bin decoding block performs at least one of a first decoding operation, a second decoding operation, a third decoding operation, and a fourth decoding operation based on an operation mode. The first decoding operation represents a first operation of restoring a first bin value based on a first context value. The second decoding operation represents a second operation of restoring a second bin value based on one of an updated first context value and a second context value. The updated first context value is obtained after the first decoding operation. The third decoding operation represents a third operation of restoring a third bin value based on one of the updated first context value and a third context value. The fourth decoding operation represents an operation of restoring at least one bypass bin value without a context value. The decoding mode control block is configured to perform an output operation to output the first bin value, to output the at least one bypass bin value, to output the first bin value and the at least one bypass bin value, to output the first bin value and one of the second and third bin values, or to output at least one of the first, second and third bin values based on the first bin value. The output operation of the decoding mode control block is performed based on the operation mode.

According to example embodiments of the present inventive concepts, a video decoder may include a multi-bin decoding circuit that includes a first decoding circuit, a second decoding circuit, a third decoding circuit, and a fourth decoding circuit. The first decoding circuit may be configured to receive as input a first context value, an input range, and an input offset, and configured to output an updated first context value, a first range, a first offset, and a first bin value responsive to a first decoding operation. The second decoding circuit may be configured to receive as input the updated first context value or a second context value, and configured to output an updated second context value and a second bin value responsive to a second decoding operation. The third decoding circuit may be configured to receive as input the updated first context value or a third context value, and configured to output an updated third context value and a third bin value responsive to a third decoding operation. The fourth decoding circuit may be configured to receive as input the first range and the first offset, or the input range and the input offset, and configured to output at least one bypass bin value responsive to a fourth decoding operation.

Video decoders according to example embodiments of the present inventive concepts may employ a multi-bin decoding in which at least two bin values are sequentially processed or decoded, may support a plurality of operation modes for sequentially decoding more than two bin values, and may selectively output results from various scenarios of the multi-bin decoding depending on the operation mode. Accordingly, video decoders according to the present inventive concepts may have a relatively increased decoding speed and enhanced performance, and may efficiently restore high quality videos.

BRIEF DESCRIPTION OF THE DRAWINGS

Illustrative, non-limiting example embodiments of the present inventive concepts will be more clearly understood from the following detailed description taken in conjunction with the accompanying drawings.

FIG. 10 is a flow chart illustrating a method of operating a video decoder according to example embodiments of the present inventive concepts.

FIG. 11 is a block diagram illustrating an electronic system according to example embodiments of the present inventive concepts.

DETAILED DESCRIPTION

Figure 1:
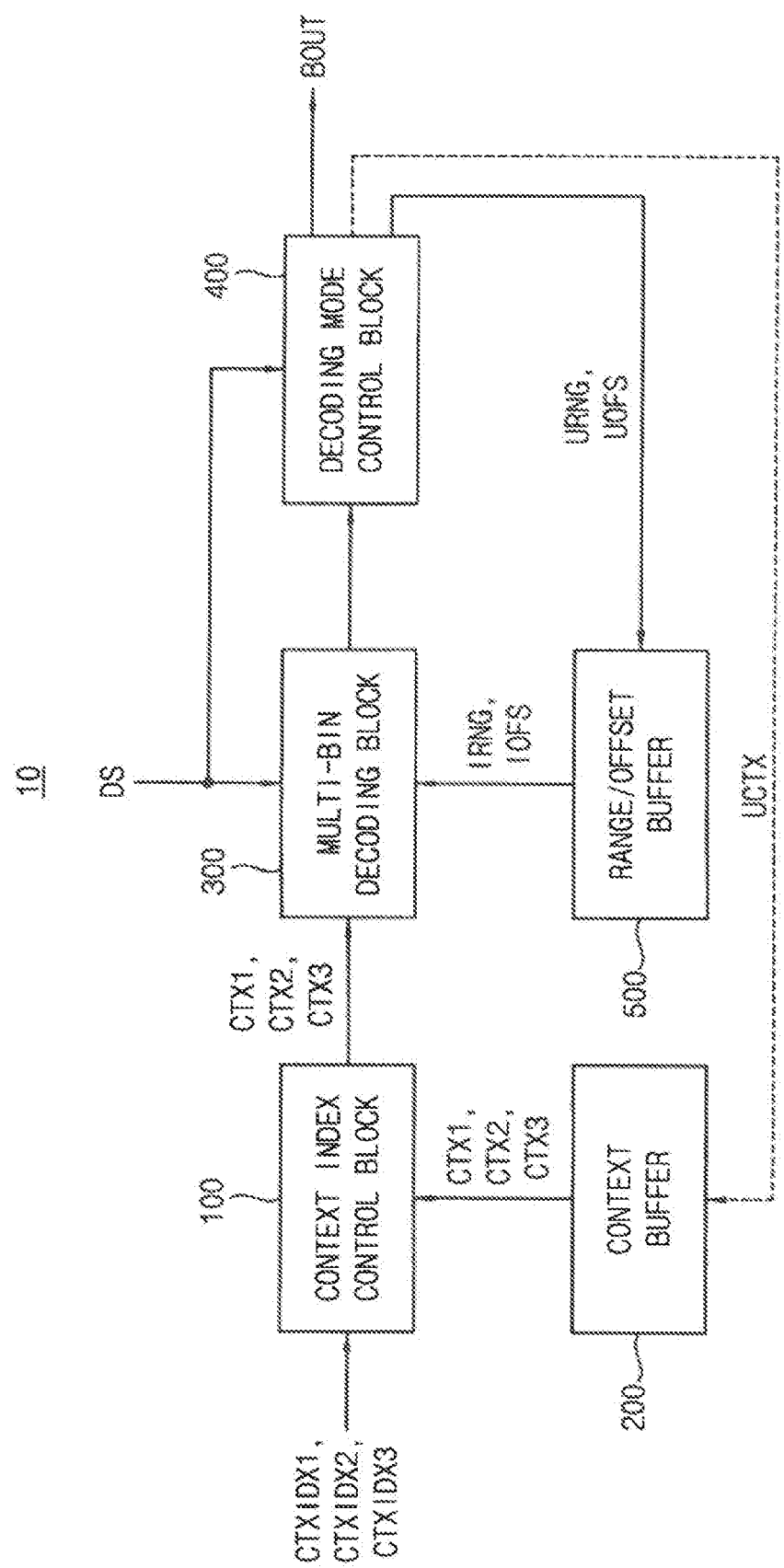
FIG. 1 is a block diagram illustrating a video decoder according to example embodiments of the present inventive concepts.

Various example embodiments of the present inventive concepts will be described more fully with reference to the accompanying drawings, in which embodiments of the present inventive concepts are shown. The present inventive concepts may, however, be embodied in many different forms and should not be construed as limited to the embodiments set forth herein. Like reference numerals refer to like elements throughout this application.

FIG. 1 is a block diagram illustrating a video decoder according to example embodiments of the present inventive concepts.

Referring to FIG. 1, a video decoder 10 may include a multi-bin decoding block 300 and a decoding mode control block 400. The video decoder 10 may further include a context index control block 100, a context buffer 200 and a range/offset buffer 500. In some embodiments, the blocks of FIG. 1 may represent circuits and/or collections of circuits configured to implement the operations described herein. In some embodiments, the blocks of FIG. 1 may represent computer operations performed by at least one processor which may be further instantiated as a computer program product.

The video decoder 10 according to example embodiments may operate (e.g., may perform a decoding operation) based on and/or using context-based adaptive binary arithmetic coding (CABAC). The video decoder 10 according to example embodiments may sequentially decode a plurality of binary values (e.g., a logical 0 or 1), or "bins." As used herein, "bin," "bin values," and "binary values" may be used interchangeably to refer the individual binary values (e.g. logical 0 or 1) processed by the video decoder 10. The individual logical values may be physically represented in multiple ways within the video decoder 10, as would be understood by one of ordinary skill in the art. For example, the logical value of a respective binary value may be represented as a particular electrical level (e.g., low or high) of a signal and/or memory location accessed by the video decoder 10. The video decoder 10 according to example embodiments may substantially simultaneously and/or concurrently output the plurality of binary values that are sequentially decoded based on an operation mode of the video decoder 10.

Hereinafter, the example embodiments will be explained in detail with reference to examples of sequentially decoding two binary values using CABAC.

The multi-bin decoding block 300 may perform at least one of a first decoding operation, a second decoding operation, a third decoding operation, and a fourth decoding operation based on an operation mode. The first decoding operation may represent an operation of restoring a first bin value based on a first context value CTX1. As used herein, the term "restoring" may include operations which decode a previously-encoded value. The first context value CTX1 may be updated during the first decoding operation, and an updated first context value (e.g., UCTX1 in FIG. 2) may be obtained after the first decoding operation. The second decoding operation may represent an operation of restoring a second bin value based on one of the updated first context value and a second context value CTX2. The third decoding operation may represent an operation of restoring a third bin value based on one of the updated first context value and a third context value CTX3. Similar to the first context value CTX1, the second and third context values CTX2 and CTX3 may be updated after the second and third decoding operations, respectively (e.g., UCTX2, UCTX3 in FIG. 2). The fourth decoding operation may represent an operation of restoring at least one bypass bin value without a context value.

As described above, the multi-bin decoding block 300 may sequentially decode two binary values (e.g., two bin values). The first decoding operation may represent an operation of decoding a first bin value among the two bin values. Each of the second and third decoding operations may represent an operation of decoding a second bin value among the two bin values. The fourth decoding operation may be referred to as a bypass decoding operation. Each of the first bin value, the second bin value, the third bin value, and the at least one bypass bin value generated by the first, second, third, and fourth decoding operations may be a logical 0 or 1.

The decoding mode control block 400 may output a result of at least one of the first, second, third, and fourth decoding operations based on an operation mode of the video decoder 10. The output operation of the decoding mode control block 400 may be performed based on the operation mode. For example, the decoding mode control block 400 may output only the first bin value, may output only the at least one bypass bin value, may output the first bin value and the at least one bypass bin value, may output the first bin value and one of the second and third bin values, or may output at least one of the first, second, and third bin values based on the first bin value. In other words, a bin value BOUT output from the decoding mode control block 400 may include a single bin value or a plurality of bin values based on the operation mode.

The decoding mode control block 400 may further output an updated context value UCTX as a result of at least one of the first, second, third, and fourth decoding operations. For example, the updated context value UCTX may include at least one of an updated first context value, an updated second context value, and an updated third context value. In some example embodiments, the updated context value UCTX may not be output.

The multi-bin decoding block 300 may additionally use an input range IRNG and/or an input offset IOFS for performing at least one of the first, second, third, and fourth decoding operations. The input range IRNG and/or the input offset IOFS may be updated before or after each decoding operation, and then the decoding mode control block 400 may further output an updated range URNG and/or an updated offset UOFS as a result of at least one of the first, second, third, and fourth decoding operations.

In some example embodiments, a decoding mode control signal DS that is received by the multi-bin decoding block 300 and the decoding mode control block 400 may represent the operation mode of the video decoder 10. Examples of the operation mode will be explained in detail with reference to FIGS. 3, 4, 5, 6, 7, and 8.

The context index control block 100 may select at least one of the first, second, and third context values CTX1, CTX2, and CTX3 among a plurality of context values based on at least one of a first context index CTXIDX1, a second context index CTXIDX2, and a third context index CTXIDX3, and may provide at least one of the first, second, and third context values CTX1, CTX2, and CTX3 to the multi-bin decoding block 300. For example, although not illustrated in FIG. 1, the context index control block 100 may receive an encoded bit stream, and may obtain at least one of the first, second, and third context indexes CTXIDX1, CTXIDX2, and CTXIDX3 from the encoded bit stream at an initial operation time.

The context buffer 200 may store the plurality of context values, and may store the updated context value UCTX after at least one of the first, second, third, and fourth decoding operations is performed.

The range/offset buffer 500 may provide the input range IRNG and the input offset IOFS to the multi-bin decoding block 300, and may store the updated range URNG and/or the updated offset UOFS after at least one of the first, second, third, and fourth decoding operations is performed. For example, although not illustrated in FIG. 1, the range/offset buffer 500 may receive an encoded bit stream, and may obtain the input range IRNG and the input offset IOFS from the encoded bit stream at an initial operation time.

CABAC is an entropy coding scheme used in a main profile of the H.264/AVC (Advanced Video Coding) video compression standard. In CABAC, each symbol is dynamically coded using statistical features to update its relative probability, thereby improving compression efficiency.

A bit stream encoded using CABAC consists of a set of syntax elements, similar to that of other moving picture compression standards. Although not illustrated in FIG. 1, the bit stream includes a plurality of slices. Each slice includes a slice header and slice data. Each slice data includes a plurality of macro blocks and a plurality of neighbor identifiers. Each macro block includes a plurality of syntax elements. Each syntax element consists of a bin string including a plurality of bin values.

CABAC decoding is a process of sequentially decoding a plurality of bin values (logical 0 or 1), from a syntax element which was encoded by a CABAC encoder. To decode a bin value, several unit operations may be used, including a context selection operation, a context model loading operation, a binary arithmetic decoding operation, a binarization matching operation, and/or a context model update operation.

In the context selection operation, context models used to decode each bin value may be selected. In the context model loading operation, the selected context models may be read. In some embodiments, the selected context models may be read into a memory of the video decoder 10. The context selection operation and the context model loading operation may be performed by the context index control block 100 and the context buffer 200. In the binary arithmetic decoding operation, a bin value may be generated, and a context value corresponding to a current context model may be selectively modified based on the generated bin value. In the binarization matching operation, it may be checked whether the generated bin value constitutes a valid bin string. In the context model update operation, if the context value is modified in the binary arithmetic decoding operation, the modified context value may be stored in a memory. These operations may have data dependency with each other such that a current bin value may not be decoded without decoding a previous bin value, and thus it may be difficult to rapidly decode a plurality of consecutive bin values.

The video decoder 10 according to example embodiments may employ a multi-bin decoding operation in which a plurality of bin values (e.g., two or more bin values) are sequentially processed (e.g., decoded), and may output the plurality of bin values restored by the multi-bin decoding operation in various ways, based on the operation mode. Accordingly, the video decoder 10 may have a relatively increased decoding speed and enhanced performance.

Figure 2:
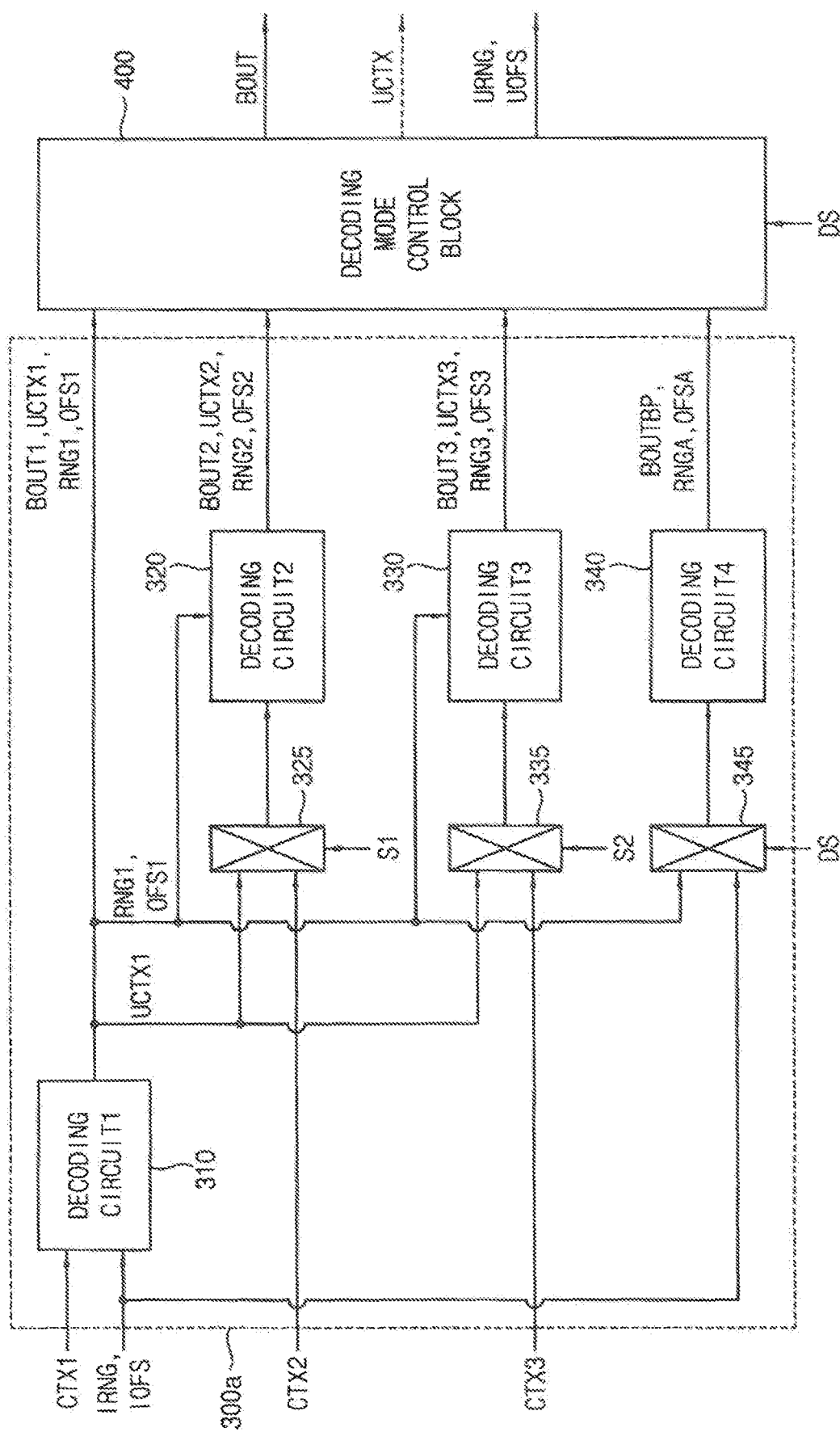
FIG. 2 is a block diagram illustrating an example of a multi-bin decoding block and a decoding mode control block included in the video decoder according to example embodiments of the present inventive concepts.

FIG. 2 is a block diagram illustrating an example of the multi-bin decoding block 300 and a decoding mode control block 400 included in the video decoder 10 (see FIG. 1) according to example embodiments of the present inventive concepts.

Referring to FIG. 2, a multi-bin decoding block 300*a* may include a first decoding circuit 310, a second decoding circuit 320, a third decoding circuit 330, and a fourth decoding circuit 340. The multi-bin decoding block 300*a* may be an example embodiment of the multi-bin decoding block 300 of FIG. 1. The multi-bin decoding block 300*a* may further include a first multiplexer 325, a second multiplexer 335, and a third multiplexer 345.

The first decoding circuit 310 may perform the first decoding operation. For example, the first decoding circuit 310 may generate a first bin value BOUT1 based on the input range IRNG, the input offset IOFS, and/or the first context value CTX1. For example, a bit stream may be encoded using CABAC. When a syntax element in the encoded bit stream is decoded using CABAC, a bin string may be obtained. Each bin value included in the bin string may have a logical value of 0 or 1. A bin value which has a higher probability of occurrence in all of the syntax elements may be referred to as a most probable symbol (MPS), and a bin value which has a lower probability of occurrence in all of the syntax elements may be referred to as a least probable symbol (LPS). The first decoding circuit 310 may determine the first bin value BOUT1 as one of the MPS and/or the LPS based on the input range IRNG, the input offset IOFS, and the first context value CTX1.

While the first bin value BOUT1 is generated, the first decoding circuit 310 may update (e.g., adjust and/or change) the first context value CTX1 to generate an updated first context value UCTX1, and may update the input range IRNG and the input offset IOFS to generate a first range RNG1 and a first offset OFS1. In CABAC, a symbol may be dynamically coded (e.g., encoded or decoded) using statistical features to update its relative probability, and thus the first context value CTX1, the input range IRNG, and the input offset IOFS may be updated to generate the first range RNG1 and the first offset OFS1, respectively.

In some example embodiments, a probability of occurrence of the MPS in all of the syntax elements may be referred to as a symbol probability. The symbol probability may be any value in a range of about 0 to 1, however, the symbol probability may be finitely represented based on quantization. Therefore, the symbol probability may be represented as a probability state index having a predetermined number of bits. A context model corresponding to the first context value CTX1 may include the probability state index. The symbol probability corresponding to the probability state index may be used for updating the input range IRNG to generate the first range RNG1. The first bin value BOUT1 may be determined by comparing the updated range (e.g., the first range RNG1) with the input offset IOFS. For example, the first bin value BOUT1 may become the MPS when the input offset IOFS is less than the first range RNG1. The first bin value BOUT1 may become the LPS when the input offset IOFS is equal to or greater than the first range RNG1. After the first bin value BOUT1 is determined, the input offset IOFS may also be updated to generate the first offset OFS1.

The second decoding circuit 320 may perform the second decoding operation. For example, the second decoding circuit 320 may generate a second bin value BOUT2 based on the first range RNG1, the first offset OFS1, and one of the updated first context value UCTX1 and the second context value CTX2. While the second bin value BOUT2 is generated, the second decoding circuit 320 may update the second context value CTX2 to generate an updated second context value UCTX2, and may update the first range RNG1 and the first offset OFS1 to generate a second range RNG2 and a second offset OFS2.

The third decoding circuit 330 may perform the third decoding operation. For example, the third decoding circuit 330 may generate a third bin value BOUT3 based on the first range RNG1, the first offset OFS1 and one of the updated first context value UCTX1 and the third context value CTX3. While the third bin value BOUT3 is generated, the third decoding circuit 330 may update the third context value CTX3 to generate an updated third context value UCTX3, and may update the first range RNG1 and the first offset OFS1 to generate a third range RNG3 and a third offset OFS3.

In some example embodiments, the second and third decoding operations may be performed substantially concurrently. As used herein, operations that are performed substantially concurrently include at least one portion of both operations being performed at a same moment in time. An operation of determining the second bin value BOUT2 in the second decoding circuit 320 and an operation of determining the third bin value BOUT3 in the third decoding circuit 330 may be similar to the operation of determining the first bin value BOUT1 in the first decoding circuit 310.

As described above with reference to FIG. 1, the multi-bin decoding block 300a may sequentially decode two binary values. The bin value BOUT1 generated by the first decoding operation may correspond to a first binary value among the two binary values. Each of the bin values BOUT2 and BOUT3 generated by the second and third decoding operations may correspond to a second binary value among the two binary values. For example, the second decoding operation may represent an operation for restoring the second binary value when the first binary value is determined to be the MPS. The third decoding operation may represent an operation for restoring the second binary value when the first binary value is determined to be the LPS. In other words, the second binary value may be pre-calculated for both cases (e.g., for a case in which the first binary value is the MPS, and for a case in which the first binary value is the LPS). Thus, a time required to decode two consecutive binary values may be reduced.

The fourth decoding circuit 340 may perform the fourth decoding operation. For example, the fourth decoding circuit 340 may generate at least one bypass bin value BOUTBP based on the input range IRNG and the input offset IOFS, or based on the first range RNG1 and the first offset OFS1. In some embodiments, a plurality of bypass bin values BOUTBP may be generated (e.g. BOUTBP1, BOUTBP2 in FIG. 4). While the at least one bypass bin value BOUTBP is generated, the fourth decoding circuit 340 may update the input range IRNG and the input offset IOFS to generate a range RNGA and a offset OFSA, or may update the first range RNG1 and the first offset OFS1 to generate the range RNGA and the offset OFSA.

The decoding mode control block 400 may output the at least one bin value BOUT, the updated context value UCTX, the updated range URNG, and/or the updated offset UOFS based on the decoding mode control signal DS.

The outputs of the decoding mode control block 400 may be changed depending on the operation mode that is controlled by the decoding mode control signal DS. For example, the at least one bin value BOUT may include at least one of the first bin value BOUT1, the second bin value BOUT2, the third bin value BOUT3, and the bypass bin value BOUTBP. The updated context value UCTX may include at least one of the updated first context value UCTX1, the updated second context value UCTX2, and the updated third context value UCTX3. The updated range URNG may include at least one of the first range RNG1, the second range RNG2, the third range RNG3, and the range RNGA. The updated offset UOFS may include at least one of the first offset OFS1, the second offset OFS2, the third offset OFS3, and the offset OFSA.

In some example embodiments, the operation mode may include a first operation mode, a second operation mode, a third operation mode, a fourth operation mode, and a fifth operation mode. In the first operation mode, the first bin value BOUT1 may be output. In the second operation mode, one bypass bin value (e.g., BOUTBP1 in FIG. 4) may be output. In the third operation mode, a plurality of bypass bin values (e.g., BOUTBP1 and BOUTBP2 in FIG. 5) may be output. In the fourth operation mode, the first bin value BOUT1 and at least one bypass bin value (e.g., BOUTBP2 in FIG. 6) may be output. In the fifth operation mode, the first bin value BOUT1 and one of the second and third bin values BOUT2 and BOUT3 may be output.

In some example embodiments, the operation mode may include a sixth operation mode, a seventh operation mode, an eighth operation mode, a ninth operation mode, a tenth operation mode, and an eleventh operation mode. In the sixth operation mode, the first and second bin values BOUT1 and BOUT2 may be output if the first bin value BOUT1 is a logical 0. In the seventh operation mode, the first and third bin values BOUT1 and BOUT3 may be output if the first bin value BOUT1 is a logical 0. In the eighth operation mode, the first bin value BOUT1 may be output if the first bin value BOUT1 is a logical 0. In the ninth operation mode, the first and second bin values BOUT1 and BOUT2 may be output if the first bin value BOUT1 is a logical 1. In the tenth operation mode, the first and third bin values BOUT1 and BOUT3 may be output if the first bin value BOUT1 is a logical 1. In the eleventh operation mode, the first bin value BOUT1 may be output if the first bin value BOUT1 is a logical 1.

The first multiplexer 325 may provide one of the updated first context value UCTX1 and the second context value CTX2 to the second decoding circuit 320 based on a first selection signal S1. For example, the first multiplexer 325 may provide the updated first context value UCTX1 to the second decoding circuit 320 when the second context value CTX2 is substantially the same as the first context value CTX1. The first multiplexer 325 may provide the second context value CTX2 to the second decoding circuit 320 when the second context value CTX2 is different from the first context value CTX1.

The second multiplexer 335 may provide one of the updated first context value UCTX1 and the third context value CTX3 to the third decoding circuit 330 based on a second selection signal S2. An operation of the second multiplexer 335 may be similar to that of the first multiplexer 325. For example, the second multiplexer 335 may provide the updated first context value UCTX1 to the third decoding circuit 330 when the third context value CTX3 is substantially the same as the first context value CTX1. The second multiplexer 335 may provide the third context value CTX3 to the third decoding circuit 330 when the third context value CTX3 is different from the first context value CTX1.

The third multiplexer 345 may provide the input range IRNG and the input offset IOFS to the fourth decoding circuit 340 based on the decoding mode control signal DS, or may provide the first range RNG1 and the first offset OFS1 to the fourth decoding circuit 340 based on the decoding mode control signal DS. For example, the third multiplexer 345 may provide the input range IRNG and the input offset IOFS to the fourth decoding circuit 340 in the second and third operation modes in which the decoding mode control block 400 outputs the at least one bypass bin value BOUTBP as the at least one bin value BOUT. The third multiplexer 345 may provide the first range RNG1 and the first offset OFS1 to the fourth decoding circuit 340 in the fourth operation mode in which the decoding mode control block 400 outputs both the first bin value BOUT1 and the at least one bypass bin value BOUTBP as the at least one bin value BOUT.

In some example embodiments, the decoding mode control signal DS, the first selection signal S1, and the second selection signal S2 may be combined into a single signal.

In some example embodiments, at least a part of the multi-bin decoding block 300a may be implemented as hardware. For example, in some embodiments, at least one of the first decoding circuit 310, the second decoding circuit 320, the third decoding circuit 330, and the fourth decoding circuit 340 may be implemented as electrical circuits, and at least one of the first context value CTX1, the second context value CTX2, and the third context value CTX3 may be electrical signals provided over conductive elements to respective ones of the at least one of the first decoding circuit 310, the second decoding circuit 320, and the third decoding circuit 330.

FIGS. 3, 4, 5, 6, 7 and 8 are diagrams for describing an operation of a video decoder based on an operation mode according to example embodiments of the present inventive concepts.

Figure 3:
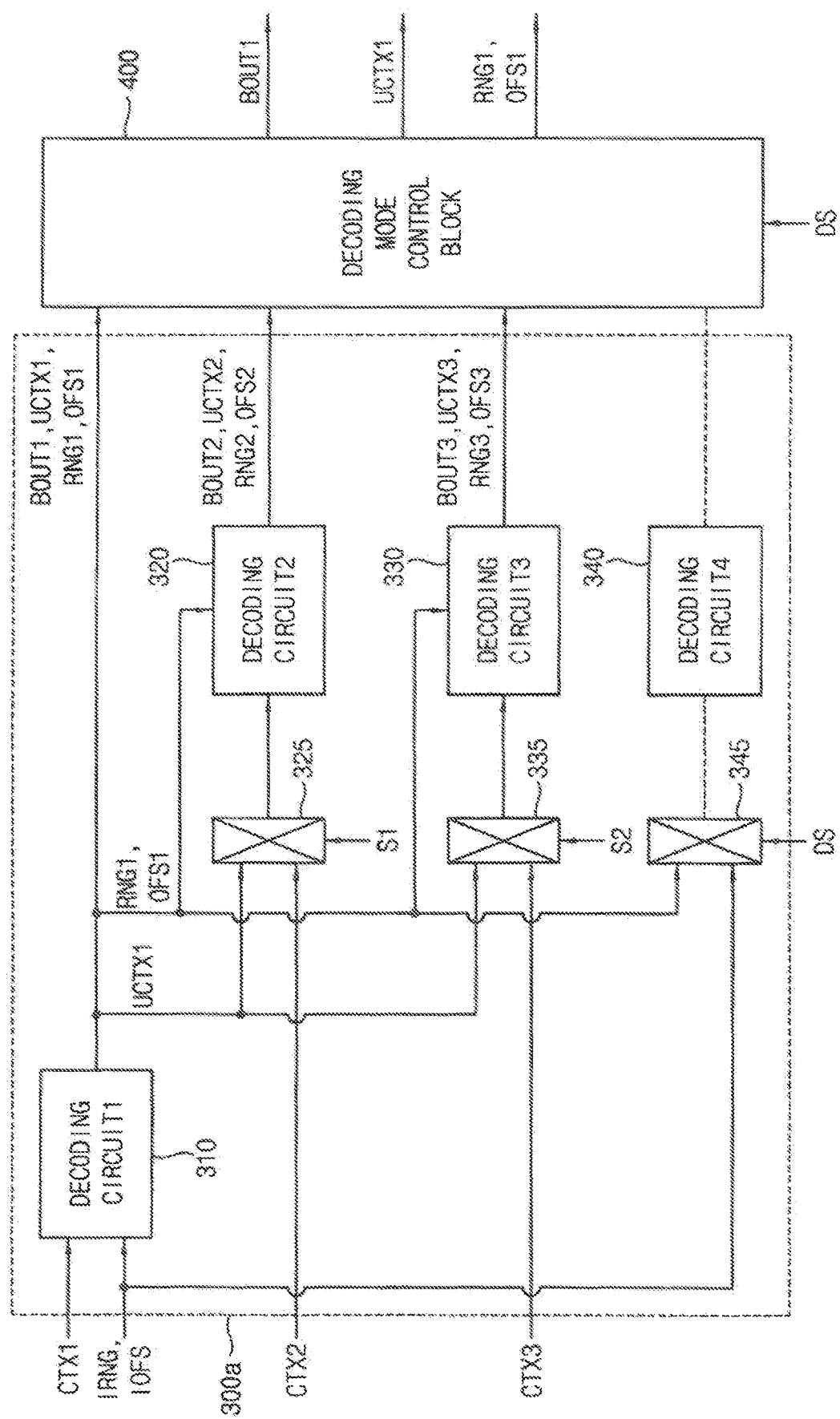
FIGS. 3, 4, 5, 6, 7 and 8 are diagrams for describing an operation of a video decoder based on an operation mode according to example embodiments of the present inventive concepts.

Referring to FIG. 3, the multi-bin decoding block 300a may perform the first decoding operation in the first operation mode as indicated by the decoding mode control signal DS. For example, the first decoding circuit 310 may generate the first bin value BOUT1 based on the input range IRNG, the input offset IOFS, and the first context value CTX1, and may update the first context value CTX1, the input range IRNG, and the input offset IOFS to generate the updated first context value UCTX1, the first range RNG1, and the first offset OFS1.

The decoding mode control block 400 may output results of the first decoding operation in the first operation mode. For example, the decoding mode control block 400 may output the first bin value BOUT1, the updated first context value UCTX1, the first range RNG1, and the first offset OFS1 based on the decoding mode control signal DS. The updated context UCTX in FIG. 1 may be stored into the context buffer 200 in FIG. 1 based on the updated first context value UCTX1. The updated range URNG and the updated offset UOFS in FIG. 1 may be stored into the range/offset buffer 500 in FIG. 1 based on the first range RNG1 and the first offset OFS1. The first operation mode may be referred to as a single-bin decoding mode.

In some example embodiments, as illustrated in FIG. 3, the second and/or third decoding operations may be further performed in the first operation mode. In other example embodiments, although not illustrated in FIG. 3, the second and/or third decoding operations may not be performed in the first operation mode. Similarly, in some embodiments, the fourth decoding operation may not be performed in the first operation mode.

Figure 4:
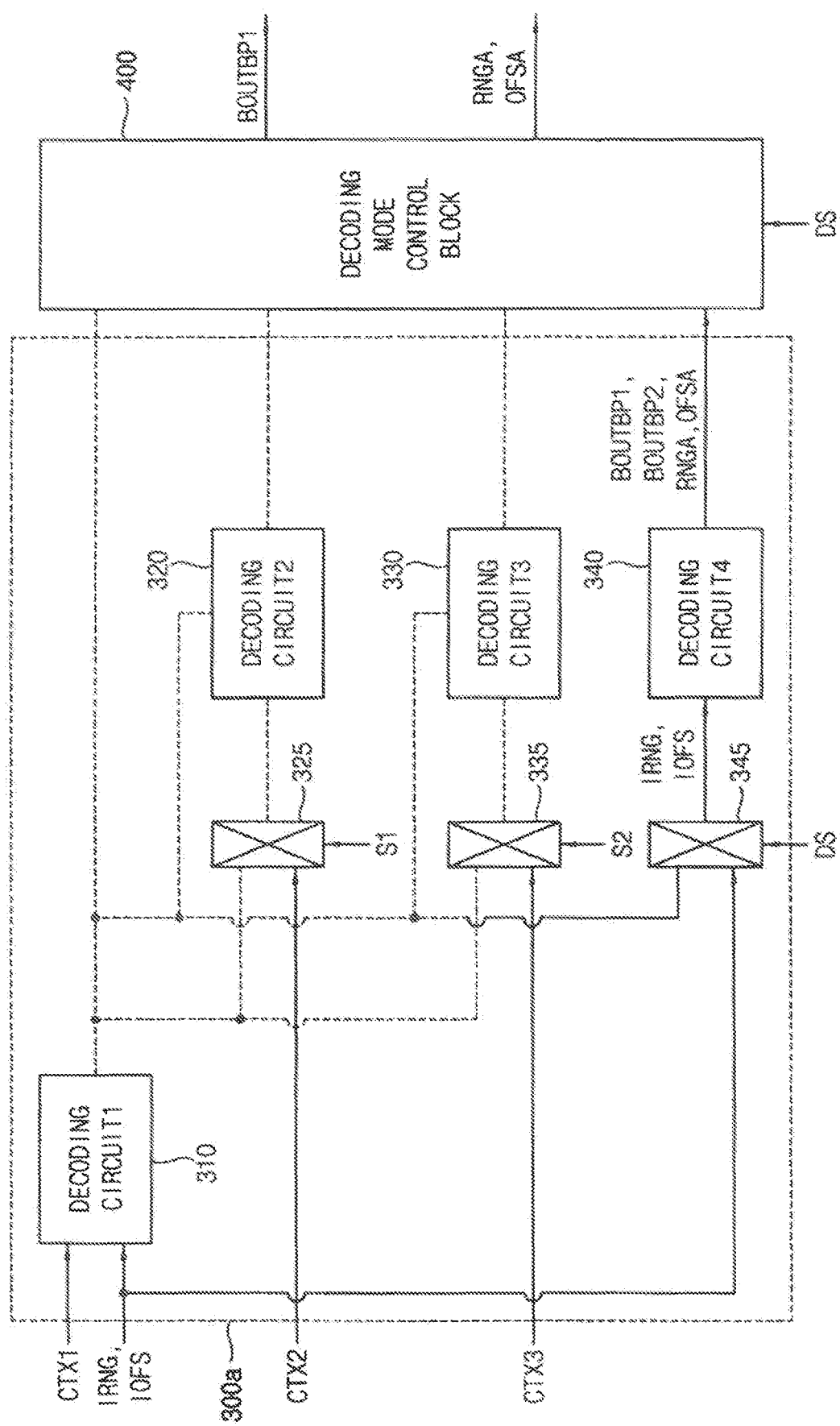

Referring to FIG. 4, the multi-bin decoding block 300a may perform the fourth decoding operation in the second operation mode as indicated by the decoding mode control signal DS. For example, the third multiplexer 345 may provide the input range IRNG and the input offset IOFS to the fourth decoding circuit 340 based on the decoding mode control signal DS. The fourth decoding circuit 340 may generate a first bypass bin value BOUTBP1 and a second bypass bin value BOUTBP2 based on the input range IRNG and the input offset IOFS, and may update the input range IRNG and the input offset IOFS to generate the range RNGA and the offset OFSA.

The decoding mode control block 400 may output some of results of the fourth decoding operation in the second operation mode. For example, the decoding mode control block 400 may output the first bypass bin value BOUTBP1, the range RNGA, and the offset OFSA based on the decoding mode control signal DS. The updated range URNG and the updated offset UOFS in FIG. 1 may be stored into the range/offset buffer 500 in FIG. 1 based on the range RNGA and the offset OFSA. The second operation mode may be referred to as a single-bypass decoding mode.

Figure 5:
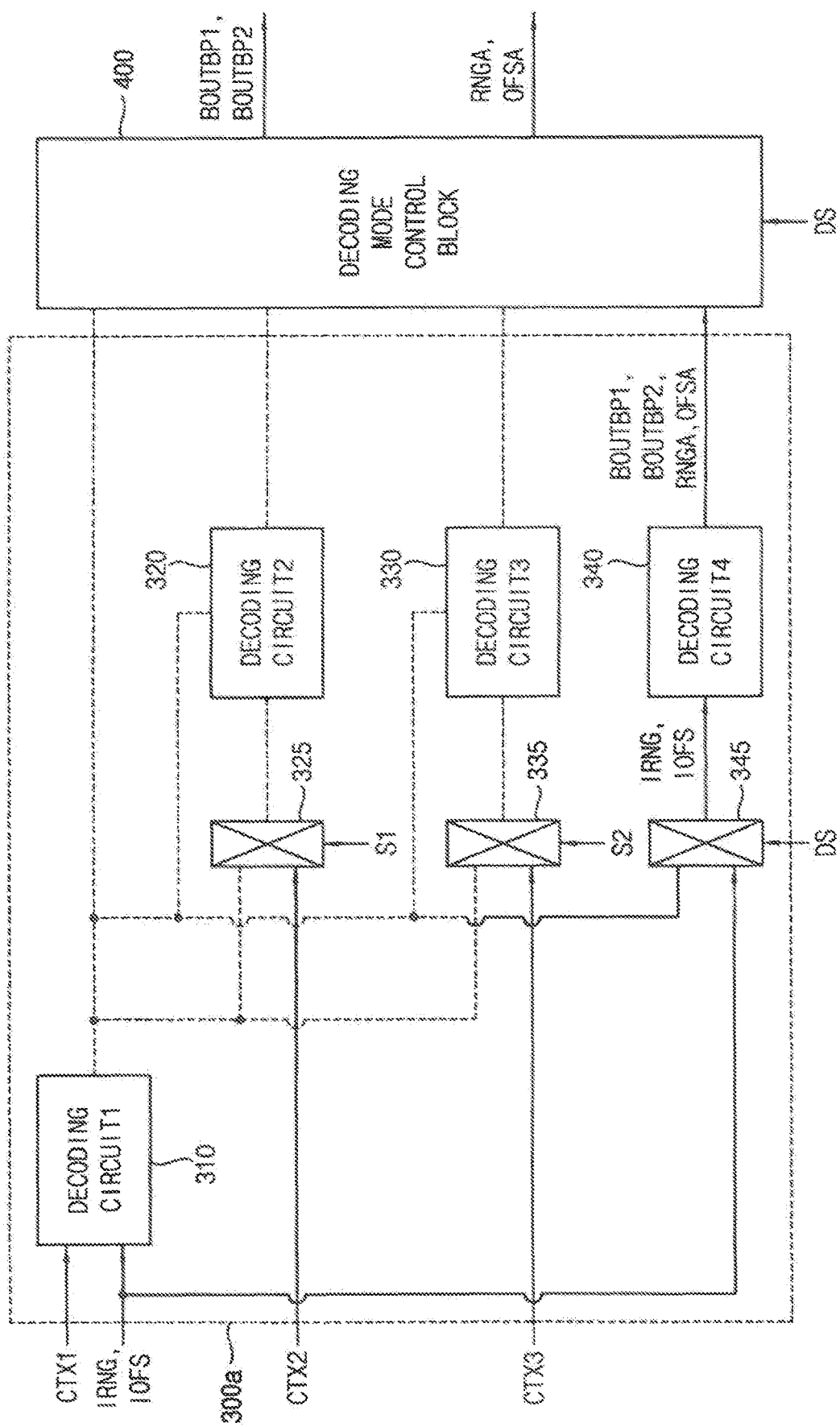

Referring to FIG. 5, the multi-bin decoding block 300a may perform the fourth decoding operation in the third operation mode as indicated by the decoding mode control signal DS. For example, the fourth decoding operation illustrated in FIG. 5 may be substantially the same as the fourth decoding illustrated in FIG. 4.

The decoding mode control block 400 may output the whole of results of the fourth decoding operation in the third operation mode. For example, the decoding mode control block 400 may output the first bypass bin value BOUTBP1, the second bypass bin value BOUTBP2, the range RNGA, and the offset OFSA based on the decoding mode control signal DS. The updated range URNG and the updated offset UOFS in FIG. 1 may be stored into the range/offset buffer 500 in FIG. 1 based on the range RNGA and the offset OFSA. The third operation mode may be referred to as a multi-bypass decoding mode.

Although FIGS. 4 and 5 illustrate an example where two bypass bin values BOUTBP1 and BOUTBP2 are generated as a result of the fourth decoding operation, more than two bypass bin values may be generated as a result of the fourth decoding operation, and then the more than two bypass bin values may be output in the third operation mode. The first, second, and third decoding operations may not always be performed in the second and/or third operation modes, and thus an updated context value may not be generated.

Figure 6:
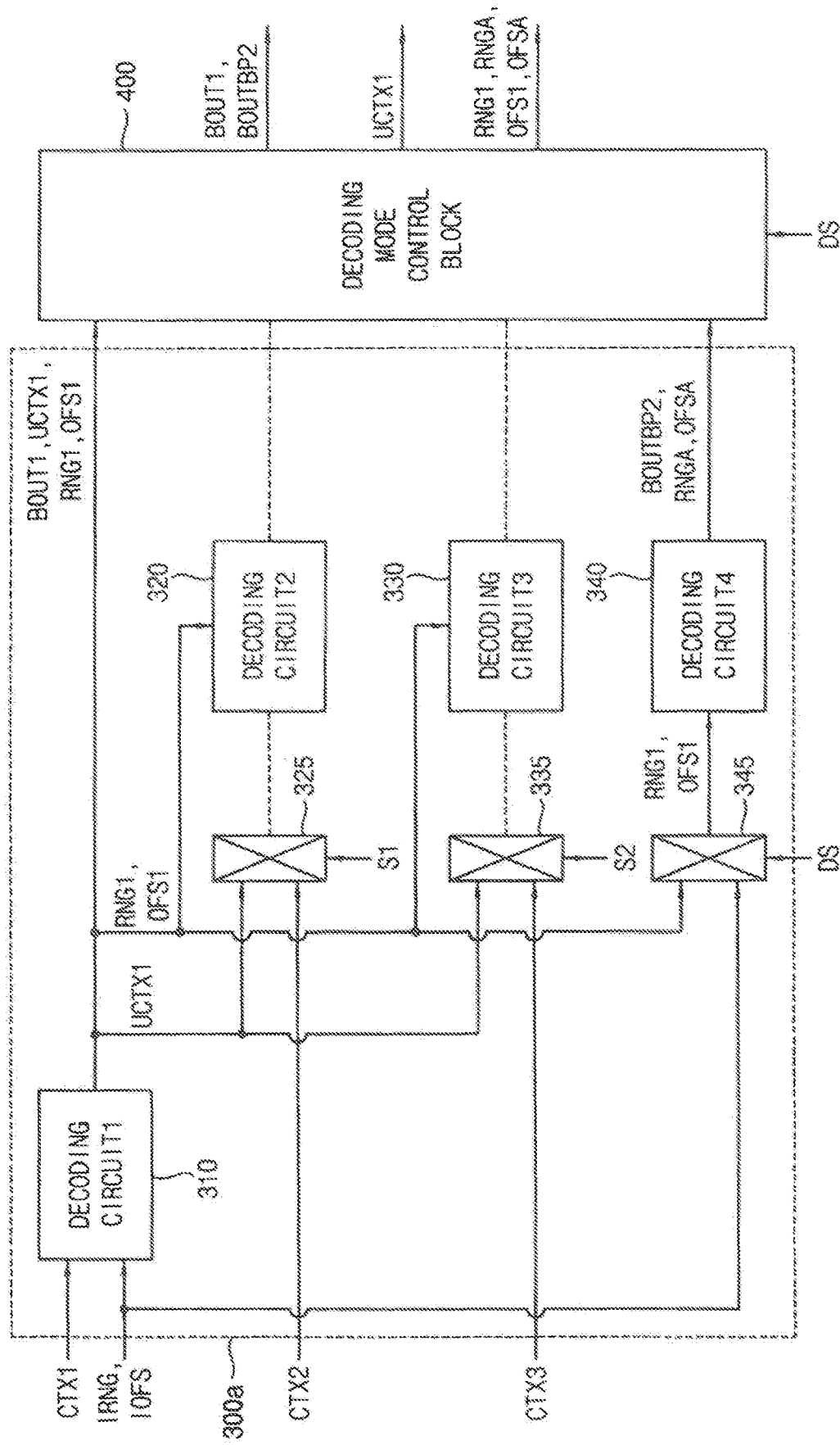

Referring to FIG. 6, the multi-bin decoding block 300a may perform the first and fourth decoding operations in the fourth operation mode as indicated by the decoding mode control signal DS. For example, the first decoding operation illustrated in FIG. 6 may be substantially the same as the first decoding operation illustrated in FIG. 3. The third multiplexer 345 may provide the first range RNG1 and the first offset OFS1 to the fourth decoding circuit 340 based on the decoding mode control signal DS. The fourth decoding circuit 340 may generate the second bypass bin value BOUTBP2 based on the first range RNG1 and the first offset OFS1, and may update the first range RNG1 and the first offset OFS1 to generate the range RNGA and the offset OFSA.

The decoding mode control block 400 may output results of the first and fourth decoding operations in the fourth operation mode. For example, the decoding mode control block 400 may output the first bin value BOUT1, the second bypass bin value BOUTBP2, the updated first context value UCTX1, the first range RNG1, the range RNGA, the first offset OFS1, and the offset OFSA based on the decoding mode control signal DS. The updated context value UCTX in FIG. 1 may be stored into the context buffer 200 in FIG. 1 based on the updated first context value UCTX1. The updated range URNG and the updated offset UOFS in FIG. 1 may be stored into the range/offset buffer 500 in FIG. 1 based on the first range RNG1, the range RNGA, the first offset OFS1, and the offset OFSA. The fourth operation mode may be referred to as a bin-bypass decoding mode.

The second and third decoding operations may not be performed in the fourth operation mode.

Figure 7:
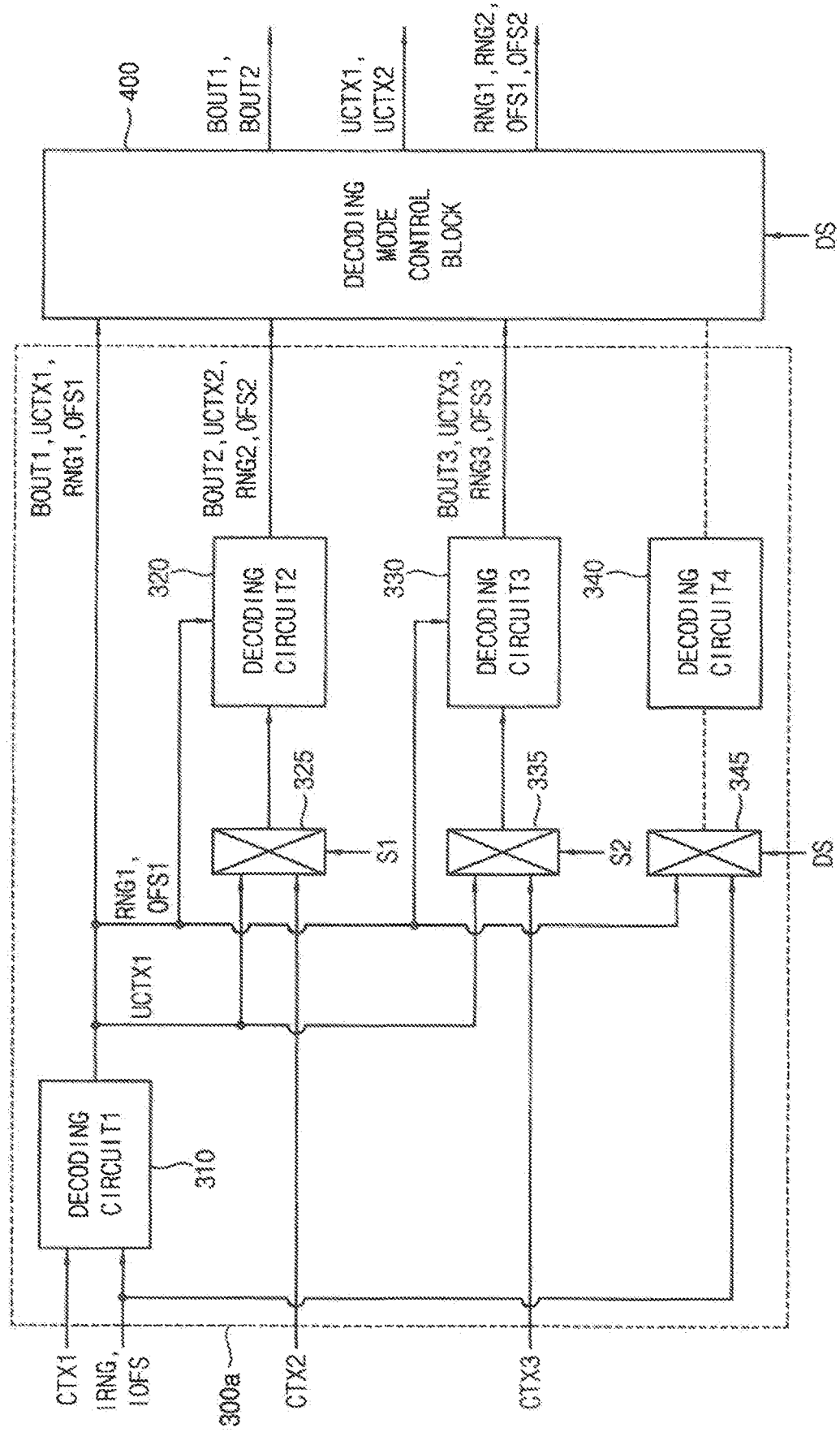
Figure 8:
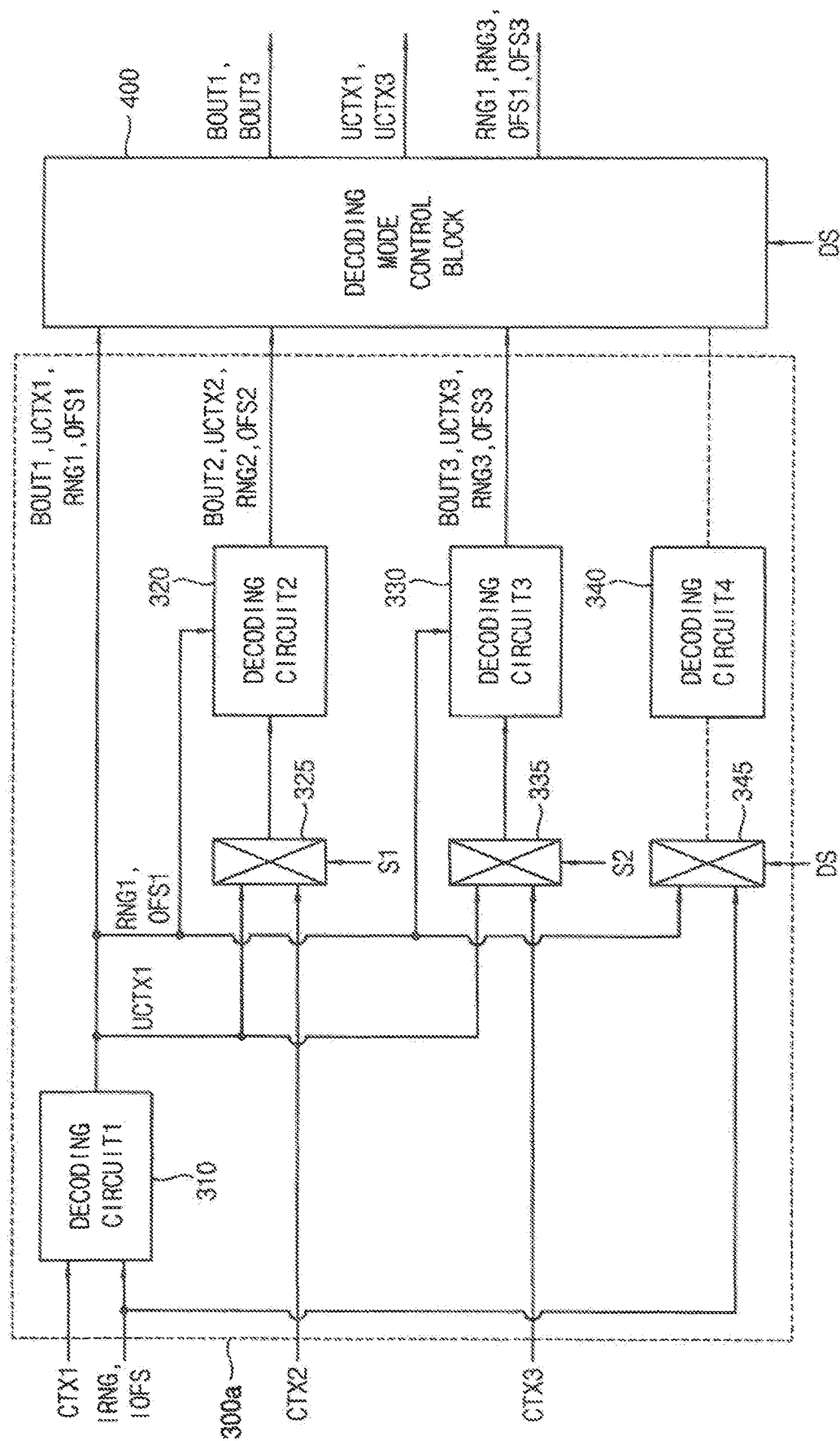

Referring to FIGS. 7 and 8, the multi-bin decoding block 300a may perform the first, second, and third decoding operations in the fifth operation mode as indicated by the decoding mode control signal DS. For example, the first decoding operation illustrated in FIGS. 7 and 8 may be substantially the same as the first decoding operation illustrated in FIG. 3. The second decoding circuit 320 may generate the second bin value BOUT2 based on the first range RNG1, the first offset OFS1, and one of the updated first context value UCTX1 and the second context value CTX2, and may update the second context value CTX2, the first range RNG1, and the first offset OFS1 to generate the updated second context value UCTX2, the second range RNG2, and the second offset OFS2. The third decoding circuit 330 may generate the third bin value BOUT3 based on the first range RNG1, the first offset OFS1, and one of the updated first context value UCTX1 and the third context value CTX3, and may update the third context value CTX3, the first range RNG1, and the first offset OFS1 to generate the updated third context value UCTX3, the third range RNG3, and the third offset OFS3.

In some example embodiments, as illustrated in FIG. 7, the decoding mode control block 400 may output results of the first and second decoding operations in the fifth operation mode. For example, the decoding mode control block 400 may output the first and second bin values BOUT1 and BOUT2, the updated first and second context values UCTX1 and UCTX2, the first and second ranges RNG1 and RNG2, and the first and second offsets OFS1 and OFS2 based on the decoding mode control signal DS. The updated context value UCTX in FIG. 1 may be stored into the context buffer 200 in FIG. 1 based on the updated first and second context values UCTX1 and UCTX2. The updated range URNG and the updated offset UOFS in FIG. 1 may be stored into the range/offset buffer 500 in FIG. 1 based on the first and second ranges RNG1 and RNG2 and the first and second offsets OFS1 and OFS2. The fifth operation mode may be referred to as a bin-bin decoding mode.

In some example embodiments, as illustrated in FIG. 8, the decoding mode control block 400 may output results of the first and third decoding operations in the fifth operation mode as indicated by the decoding mode control signal DS. For example, the decoding mode control block 400 may output the first and third bin values BOUT1 and BOUT3, the updated first and third context values UCTX1 and UCTX3, the first and third ranges RNG1 and RNG3, and the first and third offsets OFS1 and OFS3 based on the decoding mode control signal DS. The updated context value UCTX in FIG. 1 may be stored into the context buffer 200 in FIG. 1 based on the updated first and third context values UCTX1 and UCTX3. The updated range URNG and the updated offset UOFS in FIG. 1 may be stored into the range/offset buffer 500 in FIG. 1 based on the first and third ranges RNG1 and RNG3 and the first and third offsets OFS1 and OFS3.

The fourth decoding operation may not always be performed in the fifth operation mode.

Although not illustrated in FIGS. 3, 4, 5, 6, 7 and 8, an operation of the multi-bin decoding block 300a in the sixth and ninth operation modes may be similar to the operation of the multi-bin decoding block 300a illustrated in FIG. 7, an operation of the multi-bin decoding block 300a in the seventh and tenth operation modes may be similar to the operation of the multi-bin decoding block 300a illustrated in FIG. 8, and an operation of the multi-bin decoding block 300a in the eighth and eleventh operation modes may be similar to the operation of the multi-bin decoding block 300a illustrated in FIG. 3. In other words, the multi-bin decoding block 300a may perform the first, second and third decoding operations in each of the sixth, seventh, ninth, and tenth operation modes, and may perform the first decoding operation in each of the eighth and eleventh operation modes. Each of the sixth, seventh, eighth, ninth, tenth, and eleventh operation modes may be referred to as a conditional decoding mode.

Although FIGS. 1 through 8 illustrate examples where two binary values in a syntax element are sequentially decoded, the video decoder 10 according to example embodiments of the present inventive concepts may sequentially decode a plurality of binary values in a syntax element in units of two bins. For example, the video decoder 10 may decode first and second binary values in a first syntax element, may decode third and fourth binary values in the first syntax element based on a result of decoding the first and second binary values, and may decode fifth and sixth binary values in the first syntax element based on a result of decoding the third and fourth binary values.

The video decoder 10 according to example embodiments may employ the multi-bin decoding, and may selectively output results from various scenarios of the multi-bin decoding depending on the operation mode (e.g., based on the decoding mode control signal DS). Accordingly, the video decoder 10 may have a relatively increased decoding speed and enhanced performance, and may efficiently restore high quality videos (e.g., videos having a relatively high bit rate).

Figure 9:
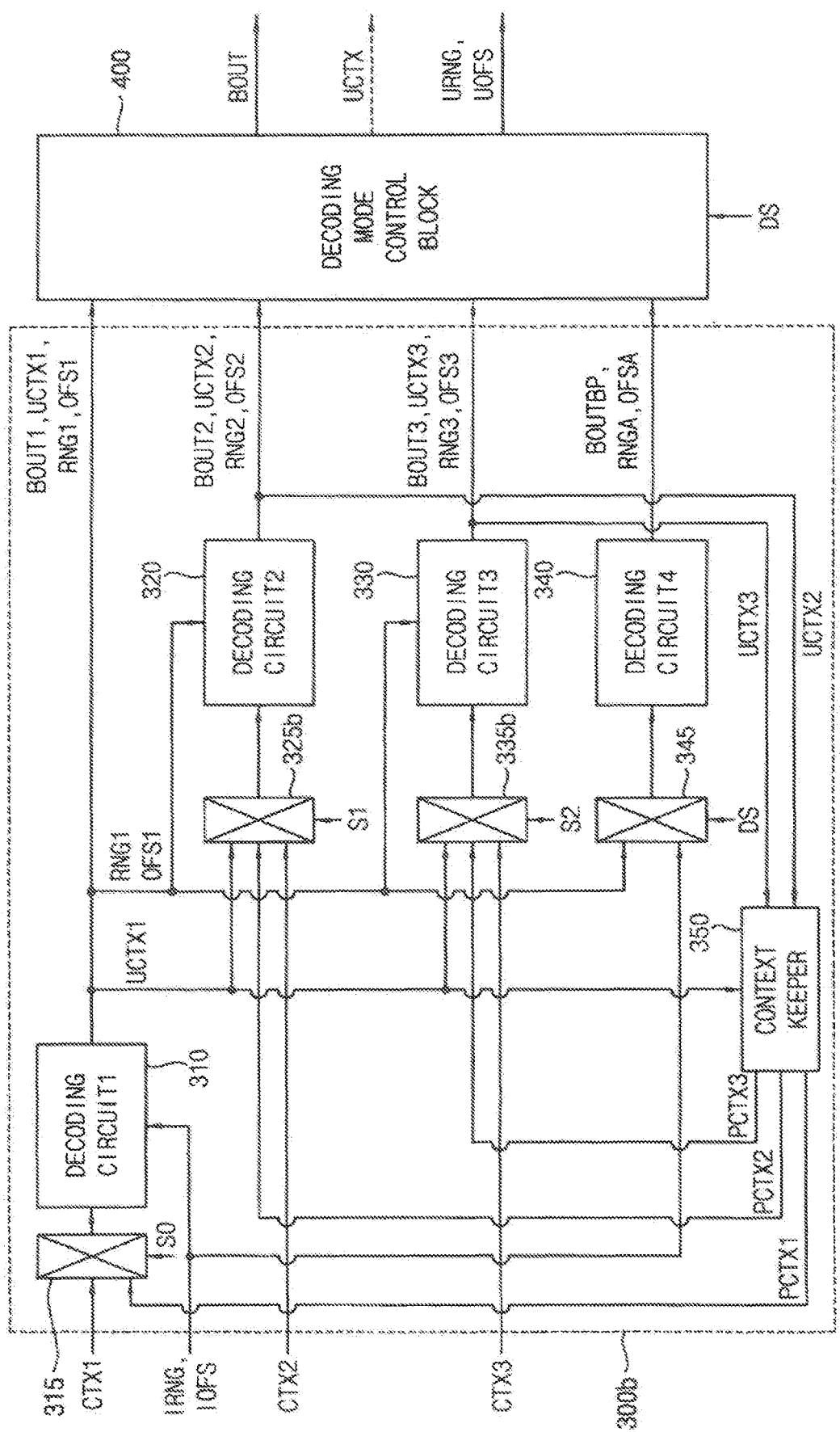
FIG. 9 is a block diagram illustrating another example of a multi-bin decoding block and a decoding mode control block included in a video decoder according to example embodiments of the present inventive concepts.

FIG. 9 is a block diagram illustrating another example of a multi-bin decoding block 300b and a decoding mode control block 400 included in the video decoder according to example embodiments of the present inventive concepts.

Referring to FIG. 9, a multi-bin decoding block 300b may include a first decoding circuit 310, a second decoding circuit 320, a third decoding circuit 330, and a fourth decoding circuit 340. The multi-bin decoding block 300*b* may be an example embodiment of the multi-bin decoding block 300 of FIG. 1. The multi-bin decoding block 300*b* may further include a first multiplexer 325*b*, a second multiplexer 335*b*, a third multiplexer 345, and a fourth multiplexer 315, and a context keeper 350.

The multi-bin decoding block 300*b* in FIG. 9 may be substantially the same as the multi-bin decoding block 300*a* in FIG. 2, except that the multi-bin decoding block 300*b* further includes the context keeper 350 and the fourth multiplexer 315, and additionally operations of the first and second multiplexers 325*b* and 335*b*, and the decoding circuits 310, 320, and 330, are changed.

The context keeper 350 may temporarily store the updated first context value UCTX1, the updated second context value UCTX2, and/or the updated third context value UCTX3 that are results of a current decoding operation of the multi-bin decoding block 300*b*. In addition, the context keeper 350 may output a first previous context value PCTX1, a second previous context value PCTX2, and/or a third previous context value PCTX3 that are results of a previous decoding operation of the multi-bin decoding block 300*b*. In some embodiments, the context keeper 350 may be a storage circuit configured to store the updated first context value UCTX1, the updated second context value UCTX2, and/or the updated third context value UCTX3.

The fourth multiplexer 315 may provide one of the first context value CTX1 and the first previous context value PCTX1 to the first decoding circuit 310 based on a selection signal S0. For example, the fourth multiplexer 315 may provide the first previous context value PCTX1 to the first decoding circuit 310 when the first context value CTX1 is substantially the same as the first previous context value PCTX1. When the first previous context value PCTX1 is provided to the first decoding circuit 310, a context selection operation and a context model loading operation for obtaining the first context value CTX1 may be omitted. The fourth multiplexer 315 may provide the first context value CTX1 to the first decoding circuit 310 when the first context value CTX1 is different from the first previous context value PCTX1.

The first decoding circuit 310 may perform the first decoding operation based on one of the first context value CTX1 and the first previous context value PCTX1. In addition, after at least one of the first, second, third, and fourth decoding operations is performed, the first decoding circuit 310 may restore a fourth bin value based on one of the updated first context value UCTX1 temporarily stored in the context keeper 350 and a fourth context value, and may update the fourth context value to generate an updated fourth context value.

The first multiplexer 325*b* may provide one of the second context value CTX2, the second previous context value PCTX2, and the updated first context value UCTX1 to the second decoding circuit 320 based on the selection signal S1. For example, the first multiplexer 325*b* may provide the second previous context value PCTX2 to the second decoding circuit 320 when the second context value CTX2 is substantially the same as the second previous context value PCTX2. When the second previous context value PCTX2 is provided to the second decoding circuit 320, a context selection operation and a context model loading operation for obtaining the second context value CTX2 may be omitted. The first multiplexer 325*b* may provide the updated first context value UCTX1 to the second decoding circuit 320 when the second context value CTX2 is substantially the same as the first context value CTX1. The first multiplexer 325*b* may provide the second context value CTX2 to the second decoding circuit 320 when the second context value CTX2 is different from the first context value CTX1 and the second previous context value PCTX2.

The second decoding circuit 320 may perform the second decoding operation based on one of the second context value CTX2, the second previous context value PCTX2, and the updated first context value UCTX1. In addition, after at least one of the first, second, third, and fourth decoding operations is performed, the second decoding circuit 320 may restore a fifth bin value based on one of the updated second context value UCTX2 temporarily stored in the context keeper 350, the updated fourth context value, and a fifth context value, and may update the fifth context value to generate an updated fifth context value.

The second multiplexer 335*b* may provide one of the third context value CTX3, the third previous context value PCTX3, and the updated first context value UCTX1 to the third decoding circuit 330 based on the selection signal S2. An operation of the second multiplexer 335*b* may be similar to that of the first multiplexer 325*b*.

The third decoding circuit 330 may perform the third decoding operation based on one of the third context value CTX3, the third previous context value PCTX3, and the updated first context value UCTX1. In addition, after at least one of the first, second, third, and fourth decoding operations is performed, the third decoding circuit 330 may restore a sixth bin value based on one of the updated third context value UCTX3 temporarily stored in the context keeper 350, the updated fourth context value, and a sixth context value, and may update the sixth context value to generate an updated sixth context value.

In some example embodiments, the decoding mode control signal DS and the selection signals S0, S1, and S2 may be combined into a single signal.

Although FIGS. 1 through 9 illustrate examples where the multi-bin decoding operation is implemented for sequentially decoding two binary values, the video decoder 10 according to example embodiments of the present inventive concepts may be implemented for sequentially decoding more than two binary values. For example, in an example of the multi-bin decoding operation for sequentially decoding three binary values, a multi-bin decoding block 300 may include one decoding circuit for restoring a first binary value among the three binary values, two decoding circuits for restoring a second binary value among the three binary values, four decoding circuit for restoring a third binary value among the three binary values, and one bypass decoding circuit. In addition, in the example of the multi-bin decoding for sequentially decoding three binary values, at least one operation mode for outputting three binary values may be further included.

FIG. 10 is a flow chart illustrating a method of operating a video decoder according to example embodiments of the present inventive concepts.

Referring to FIGS. 1, 2 and 10, in a method of operating the video decoder 10 according to example embodiments, an operation mode of the video decoder 10 and context values may be selected (step S100). For example, in the example of sequentially decoding two binary values using CABAC, one of the first, second, third, fourth, fifth, sixth, seventh, eighth, ninth, tenth, and eleventh operation modes may be selected based on the decoding mode control signal DS. The context index control block 100 and the context buffer 200 may select the first, second, and/or third context values CTX1, CTX2 and/or CTX3 by performing the context selection operation and the context model loading operation.

Based on the selected operation mode and/or the selected context values, a multi-bin decoding operation may be performed (step S200), and at least one of the bin values that are results of the multi-bin decoding operation may be output depending on the operation mode (step S300). For example, in the example of sequentially decoding two binary values using CABAC, the multi-bin decoding block 300a may perform at least one of the first, second, third, and fourth decoding operations. The decoding mode control block 400 may output a result of at least one of the first, second, third, and fourth decoding operations based on the decoding mode control signal DS. The decoding mode control block 400 may output only the first bin value BOUT1, may output only the at least one bypass bin value BOUTBP, may output the first bin value BOUT1 and the at least one bypass bin value BOUTBP, may output the first bin value BOUT1 and one of the second and third bin values BOUT2 and BOUT3, or may output at least one of the first, second, and third bin values BOUT1, BOUT2, and BOUT3 based on the first bin value BOUT1.

After at least one of the bin values are output, the context values, ranges, and offsets may be updated (step S400). For example, the updated context value UCTX may be stored into the context buffer 200 based on at least one of the updated first, second, and third context values UCTX1, UCTX2, and UCTX3. The updated range URNG and the updated offset UOFS may be stored into the range/offset buffer 500 based on at least one of the ranges RNG1, RNG2, RNG3, and RNGA and at least one of the offsets OFS1, OFS2, OFS3, and OFSA.

It may be checked whether the results of the multi-bin decoding operation or the bin values obtained by steps S200 and S300 are valid (step S500). If it is determined that a bin string that is currently generated and includes current two bins is valid by the binarization matching operation (step S500: YES), a decoding operation for the current two bins is completed, and then a decoding operation for subsequent two bins may be performed. If it is determined that the bin string that is currently generated and includes the current two bins is invalid (step S500: NO), steps S100, S200, S300, and S400 may be performed again for the current two bins.

As will be appreciated by those skilled in the art, the present inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can store a program for use by and/or in connection with an instruction execution system, apparatus, and/or device. For example, the computer readable medium may be a non-transitory computer readable medium.

In some example embodiments, a video encoder and the video decoder according to example embodiments of the present inventive concepts may be merged in the same integration circuit and/or corresponding software, and then the merged device may be referred to as a video coder/decoder (codec).

FIG. 11 is a block diagram illustrating an electronic system according to example embodiments of the present inventive concepts.

Referring to FIG. 11, an electronic system 1000 may include a video source 1010 and a video codec 1020. The electronic system 1000 may further include at least one processor 1030, a connectivity module 1040, an input/output (I/O) device 1050, and a power supply 1060.

The video source 1010 provides an encoded bit stream. For example, the video source 1010 may include a storage device that pre-stores the encoded bit stream or downloads the encoded bit stream (e.g., from a content supply system or a cloud computing system) to store the downloaded encoded bit stream.

The video codec 1020 may include a video decoder according to example embodiments. The video decoder decodes the encoded bit stream to generate a restored, e.g., decoded, video. The video decoder may be the video decoder 10 of FIG. 1, may include the multi-bin decoding block 300, and may support a plurality of operation modes for sequentially decoding at least two bin values. Accordingly, the video codec 1020 may have a relatively increased decoding speed and enhanced performance, and may efficiently restore high quality videos. Though illustrated as separate elements in FIG. 11, it will be understood that, in some embodiments, the video codec 1020 may constitute executable code stored in a memory of the electronic system 1000 that may be executed by the at least one processor 1030.

The at least one processor 1030 may control overall operations of the electronic system 1000. The connectivity module 1040 may communicate with an external device (not shown). The I/O device 1050 may include at least one input device such as, for example, a keypad, a button, a microphone, a touch screen, etc., and/or at least one output device such as, for example, a speaker, a display device, etc. The power supply 1060 may provide power to the electronic system 1000.

The present inventive concepts may be applied to various devices and systems that include the video decoder. For example, the present disclosure may be applied to systems such as be a mobile phone, a smart phone, a tablet computer, a laptop computer, a personal digital assistants (PDA), a portable multimedia player (PMP), a digital camera, a portable game console, a wearable system, an internet of things (IoT) system, a three-dimensional (3D) geometry reconstruction system, an array camera system, a virtual reality (VR) system, an augmented reality (AR) system, etc.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When a certain example embodiment may be implemented differently, a specific process order may be performed differently from the described order. For example, two consecutively described processes may be performed substantially at the same time or performed in an order opposite to the described order.

As used herein the term "and/or" includes any and all combinations of one or more of the associated listed items. Expressions such as "at least one of," when preceding a list of elements, modify the entire list of elements and do not modify the individual elements of the list.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A video decoder comprising:
a multi-bin decoding block configured to perform at least one of a first decoding operation, a second decoding operation, a third decoding operation, and a fourth decoding operation based on an operation mode, the first decoding operation representing a first operation of restoring a first bin value based on a first context value, the second decoding operation representing a second operation of restoring a second bin value based on one of an updated first context value and a second context value, the updated first context value being obtained after the first decoding operation, the third decoding operation representing a third operation of restoring a third bin value based on one of the updated first context value and a third context value, the fourth decoding operation representing a fourth operation of restoring at least one bypass bin value without a context value; and a decoding mode control block that is configured to perform an output operation to output the first bin value, to output the at least one bypass bin value, to output the first bin value and the at least one bypass bin value, to output the first bin value and one of the second and third bin values, or to output at least one of the first, second, and third bin values based on the first bin value, the output operation of the decoding mode control block being performed based on the operation mode, wherein the at least one bypass bin value comprises a first bypass bin value and a second bypass bin value, and wherein the operation mode comprises a first operation mode in which only the first bin value is output, a second operation mode in which only the first bypass bin value is output, a third operation mode in which the first and second bypass bin values are output, a fourth operation mode in which the first bin value and the second bypass bin value are output, and a fifth operation mode in which the first bin value and one of the second and third bin values are output.

2. The video decoder of claim 1, wherein the multi-bin decoding block comprises:

a first decoding circuit configured to generate the first bin value based on an input range, an input offset, and the first context value, configured to update the first context value, and configured to update the input range and the input offset to generate a first range and a first offset;

a second decoding circuit configured to generate the second bin value based on the first range, the first offset, and one of the updated first context value and the second context value, configured to update the second context value, and configured to update the first range and the first offset to generate a second range and a second offset;

a third decoding circuit configured to generate the third bin value based on the first range, the first offset, and one of the updated first context value and the third context value, configured to update the third context value, and configured to update the first range and the first offset to generate a third range and a third offset; and a fourth decoding circuit configured to generate the at least one bypass bin value based on the input range and the input offset or based on the first range and the first offset, and configured to update the input range and the input offset or the first range and the first offset to generate a fourth range and a fourth offset.

3. The video decoder of claim 2, wherein the multi-bin decoding block further comprises:

a first multiplexer configured to provide one of the updated first context value and the second context value to the second decoding circuit based on a first selection signal;

a second multiplexer configured to provide one of the updated first context value and the third context value to the third decoding circuit based on a second selection signal; and a third multiplexer configured to provide the input range and the input offset to the fourth decoding circuit, or configured to provide the first range and the first offset to the fourth decoding circuit, based on a decoding mode control signal.

4. The video decoder of claim 3, wherein the first multiplexer is configured to provide the updated first context value to the second decoding circuit when the second context value is substantially the same as the first context value, and provide the second context value to the second decoding circuit when the second context value is different from the first context value.

5. The video decoder of claim 3, wherein the third multiplexer is configured to
provide the input range and the input offset to the fourth decoding circuit when the decoding mode control block outputs only the at least one bypass bin value, and
provide the first range and the first offset to the fourth decoding circuit when the decoding mode control block outputs the first bin value and the at least one bypass bin value.

6. The video decoder of claim 2, wherein the multi-bin decoding block further comprises:
a context storage configured to store the updated first context value, an updated second context value, and an updated third context value.

7. The video decoder of claim 6, wherein the first decoding circuit is configured to restore a fourth bin value based on one of the updated first context value and a fourth context value, and configured to update the fourth context value after at least one of the first, second, third, and fourth decoding operations is performed.

8. The video decoder of claim 7, wherein the second decoding circuit is configured to restore a fifth bin value based on one of the updated second context value, an updated fourth context value, and a fifth context value after at least one of the first, second, third and fourth decoding operations is performed.

9. The video decoder of claim 1, wherein the multi-bin decoding block is configured to:
perform the first decoding operation in the first operation mode;
perform the fourth decoding operation in each of the second and third operation modes;
perform the first and fourth decoding operations in the fourth operation mode; and
perform the first, second, and third decoding operations in the fifth operation mode.

10. The video decoder of claim 1, wherein the operation mode further comprises a sixth operation mode in which the first and second bin values are output in response to the first bin value comprising a logical 0, a seventh operation mode in which the first and third bin values are output in response to the first bin value comprising the logical 0, an eighth operation mode in which only the first bin value is output in response to the first bin value comprising the logical 0, a ninth operation mode in which the first and second bin values are output in response to the first bin value comprising a logical 1, a tenth operation mode in which the first and third bin values are output in response to the first bin value comprising the logical 1, and an eleventh operation mode in which only the first bin value is output in response to the first bin value comprising the logical 1.

11. The video decoder of claim 10, wherein the multi-bin decoding block is configured to:
perform the first, second, and third decoding operations in each of the sixth, seventh, ninth, and tenth operation modes; and
perform the first decoding operation in each of the eighth and eleventh operation modes.

12. The video decoder of claim 1, further comprising:
a context index control block configured to select the first, second, and third context values among a plurality of context values based on a first context index, a second context index, and a third context index, and configured to provide the first, second, and third context values to the multi-bin decoding block.

13. The video decoder of claim 1, wherein the first, second, third, and fourth decoding operations are performed using context-based adaptive binary arithmetic coding (CABAC).

14. An electronic system comprising:
a video source configured to provide an encoded bit stream; and
a video decoder configured to decode the encoded bit stream to generate a restored video, the video decoder comprising:
a multi-bin decoding block configured to perform at least one of a first decoding operation, a second decoding operation, a third decoding operation, and a fourth decoding operation based on an operation mode, the first decoding operation representing a first operation of restoring a first bin value based on a first context value, the second decoding operation representing a second operation of restoring a second bin value based on one of an updated first context value and a second context value, the updated first context value being obtained after the first decoding operation, the third decoding operation representing a third operation of restoring a third bin value based on one of the updated first context value and a third context value, the fourth decoding operation representing a fourth operation of restoring at least one bypass bin value without a context value; and
a decoding mode control block that is configured to perform an output operation to output the first bin value, to output the at least one bypass bin value, to output the first bin value and the at least one bypass bin value, to output the first bin value and one of the second and third bin values, or to output at least one of the first, second, and third bin values based on the first bin value, the output operation of the decoding mode control block being performed based on the operation mode,
wherein the second decoding operation is configured to restore the second bin value based on the updated first context value responsive to the first context value being substantially the same as the second context value, and
wherein the second decoding operation is configured to restore the second bin value based on the second context value responsive to the first context value being different than the second context value.

15. The electronic system of claim 14, wherein the at least one bypass bin value comprises a first bypass bin value and a second bypass bin value, and
wherein the operation mode comprises a first operation mode in which only the first bin value is output, a second operation mode in which only the first bypass bin value is output, a third operation mode in which the first and second bypass bin values are output, a fourth operation mode in which the first bin value and the second bypass bin value are output, and a fifth operation mode in which the first bin value and one of the second and third bin values are output.

16. A video decoder comprising:
a multi-bin decoding circuit comprising:
a first decoding circuit configured to receive as input a first context value, an input range, and an input offset, and configured to output an updated first context value, a first range, a first offset, and a first bin value responsive to a first decoding operation;

a second decoding circuit configured to receive as input the updated first context value or a second context value, and configured to output an updated second context value and a second bin value responsive to a second decoding operation;

a third decoding circuit configured to receive as input the updated first context value or a third context value, and configured to output an updated third context value and a third bin value responsive to a third decoding operation; and a fourth decoding circuit configured to receive as input the first range and the first offset, or the input range and the input offset, and configured to output at least one bypass bin value responsive to a fourth decoding operation, wherein the video decoder is configured to receive a decoding mode control signal indicating an operation mode of the video decoder, wherein the first range and the first offset are configured to be input into the fourth decoding circuit responsive to the decoding mode control signal indicating a first operation mode of the video decoder, and wherein the input range and the input offset are configured to be input into the fourth decoding circuit responsive to the decoding mode control signal indicating a second operation mode, different from the first operation mode, of the video decoder.

17. The video decoder of claim 16, wherein the video decoder is configured to output at least one of the first bin value, the second bin value, the third bin value, and the at least one bypass bin value responsive to the operation mode indicated by the decoding mode control signal.

18. The video decoder of claim 16, wherein the updated first context value is configured to be input into the second decoding circuit as the input responsive to the first context value being substantially the same as the second context value, and wherein the second context value is configured to be input into the second decoding circuit as the input responsive to the first context value being different than the second context value.

19. The video decoder of claim 16, further comprising a context storage configured to store the updated first context value, the updated second context value, and/or the updated third context value responsive to a previous decoding operation and to provide the updated first context value, the updated second context value, and/or the updated third context value as the input to the first decoding circuit, the second decoding circuit, and/or the third decoding circuit in a subsequent decoding operation.

20. The video decoder of claim 16, wherein the at least one bypass bin value comprises a first bypass bin value and a second bypass bin value, and wherein, in the first operation mode, only the first bypass bin value is output and, in the second operation mode, the first bin value and the second bypass bin value are output.

* * * * *